United States Patent
De Samber et al.

(10) Patent No.: US 11,067,253 B2
(45) Date of Patent: Jul. 20, 2021

(54) LUMINAIRE AND LIGHTING METHOD

(71) Applicant: SIGNIFY HOLDING B.V., Eindhoven (NL)

(72) Inventors: Marc Andre De Samber, Lommel (BE); Hugo Johan Cornelissen, Escharen (NL); Jochen Renaat Van Gheluwe, Lommel (BE); Norbertus Antonius Maria Sweegers, Lierop (NL)

(73) Assignee: Signify Holding B.V., Eindhoven (NL)

( * ) Notice: Subject to any disclaimer, the term of this patent is extended or adjusted under 35 U.S.C. 154(b) by 0 days.

(21) Appl. No.: 16/753,003

(22) PCT Filed: Oct. 2, 2018

(86) PCT No.: PCT/EP2018/076721
§ 371 (c)(1),
(2) Date: Apr. 2, 2020

(87) PCT Pub. No.: WO2019/068675
PCT Pub. Date: Apr. 11, 2019

(65) Prior Publication Data
US 2020/0292151 A1 Sep. 17, 2020

(30) Foreign Application Priority Data
Oct. 5, 2017 (EP) .................................... 17194861

(51) Int. Cl.
*F21V 9/14* (2006.01)
*F21S 8/08* (2006.01)
(Continued)

(52) U.S. Cl.
CPC ................ *F21V 9/14* (2013.01); *F21S 8/085* (2013.01); *F21V 7/0008* (2013.01);
(Continued)

(58) Field of Classification Search
CPC ........ F21V 9/14; F21V 7/0083; F21V 7/0008; F21V 23/003; F21Y 2105/18
See application file for complete search history.

(56) References Cited

U.S. PATENT DOCUMENTS 4,164,012 A * 8/1979 Gulliksen ................. F21V 9/40
362/282
4,219,867 A 8/1980 Zehender
(Continued)

FOREIGN PATENT DOCUMENTS

CN 202302989 U 7/2012
CN 104214537 A 12/2014
(Continued)

*Primary Examiner* — Donald L Raleigh
(74) *Attorney, Agent, or Firm* — Daniel J. Piotrowski (57) ABSTRACT

A luminaire (10) comprises an array of lighting units (12) arranged as a plurality of regions (14a-14e). A reflector arrangement (16) is provided over the array of lighting units (12) for directing the light from each region (14a-14e) of the luminaire (10) to a different spread of light output directions. Each lighting unit (12) of at least one of the regions (14a-14e) comprises a first sub-unit (20, 22, 24) with a first polarised light output and a second sub-unit (20, 22, 24) with a second light output which is different from the first light output in polarisation, wherein the first and second sub-units (20, 22, 24) are independently controllable. In this way, light output in a certain range of directions can be controlled to have a desired polarisation. By actuating different sub-units (20, 22, 24), the polarisation can be dynamically controlled. Thus, a system can be set up with a desired static polarisation output pattern, or the polarisation pattern may be controlled to evolve over time, for example in response to external user, sensor or data input.

15 Claims, 6 Drawing Sheets

(51) Int. Cl.

| | | |
|---|---|---|
| *F21V 7/00* | (2006.01) | |
| *F21V 7/05* | (2006.01) | |
| *F21V 23/00* | (2015.01) | |
| *F21V 23/04* | (2006.01) | |
| *F21V 31/00* | (2006.01) | |
| *F21Y 105/18* | (2016.01) | |
| *F21Y 115/10* | (2016.01) | |
| *F21W 131/103* | (2006.01) | |

(52) U.S. Cl.
CPC .......... *F21V 7/0083* (2013.01); *F21V 7/0091* (2013.01); *F21V 7/05* (2013.01); *F21V 23/003* (2013.01); *F21V 23/0442* (2013.01); *F21V 31/005* (2013.01); *F21W 2131/103* (2013.01); *F21Y 2105/18* (2016.08); *F21Y 2115/10* (2016.08)

(56) References Cited

U.S. PATENT DOCUMENTS

| | | |
|---|---|---|
| 6,552,740 B1 | 4/2003 | Wong et al. |
| 7,151,054 B2 | 12/2006 | Sandhu et al. |
| 7,580,192 B1 * | 8/2009 | Chu ...................... F21V 7/0091 359/641 |
| 8,842,237 B2 * | 9/2014 | Chen ...................... G02B 30/25 349/61 |
| 2002/0089747 A1 | 7/2002 | Hay |
| 2009/0168394 A1 | 7/2009 | Hikmet |
| 2009/0290354 A1 * | 11/2009 | Moriyama ............... F21V 29/75 362/296.01 |
| 2010/0295067 A1 * | 11/2010 | Vissenberg ........ G02B 19/0028 257/89 |
| 2015/0002305 A1 * | 1/2015 | Wells ..................... H05B 47/16 340/815.4 |
| 2015/0023036 A1 * | 1/2015 | Burgess ................. B60Q 1/323 362/508 |
| 2016/0097515 A1 | 4/2016 | De Vaan et al. |

FOREIGN PATENT DOCUMENTS

| | | | |
|---|---|---|---|
| DE | WO-2016055291 A1 * | 4/2016 | ......... G02B 19/0057 |
| GB | 880374 A | 10/1961 | |
| NL | WO-2017063845 A1 * | 4/2017 | ............ H05B 47/16 |
| WO | 2017063845 A1 | 4/2017 | |

\* cited by examiner

LUMINAIRE AND LIGHTING METHOD

CROSS-REFERENCE TO PRIOR APPLICATIONS

This application is the U.S. National Phase application under 35 U.S.C. § 371 of International Application No. PCT/EP2018/076721, filed on Oct. 2, 2018, which claims the benefit of European Patent Application No. 17194861.5, filed on Oct. 5, 2017. These applications are hereby incorporated by reference herein.

FIELD OF THE INVENTION

This invention relates to a luminaire for providing a light output with controllable polarization.

BACKGROUND OF THE INVENTION

Observation of objects under polarized light illumination or after polarization of the light before reaching an observer results in a different perception of the object. Polarized light is known to influence the perceived contrast and color experience, and it strongly reduces reflections. A most common occurrence of undesired reflection is the reflection from a water surface, which results in glare. This often arises when there are wet weather conditions. This is the result of the different optical properties of the illuminated material and the interfaces for the different polarization directions. These interactions for different polarizations result from optical principles including specular Fresnel reflection, birefringence and dichroism.

To create polarized light for illumination, light is typically modified by applying a polarizing filter between the light source and the object. Consequently, this implies optical loss, since for randomly polarized light, more than 50% of the polarized light is reflected back or absorbed by the filter. By optimizing a reflective system, a part of this light can be recycled through the polarization element to increase the overall efficiency.

The influence of polarization on the perception of an illuminated object is not limited to reflection from a water surface. For example, illumination of objects in a retail shop setting using polarized light can have different effects. The main effects are an improved perception of hue/contrast differences, and again the reduction of glare, for example of relevance for packaged food. In other cases, glare enhancing can be beneficial.

The effect realized by the use of polarized light is dependent on the angle of the viewer versus the incident light, and hence versus the light source.

The use of polarization control in lighting systems is not widespread. Polarization control is of course used in sun glasses and in windows to reduce the effect of disturbing and even dangerous light reflection in e.g. car driving and sports such as skiing.

There are many other opportunities to use polarized light either to moderate unwanted effects or to enhance desirable effects. The implementation is however often hampered by unavailability of suitable light sources. For example, polarization-retaining optical materials, geometries (form factors), product architectures, and cost are blocking factors that limit the implementation of the use of polarized light.

There remains a need for a compact light source with a controllable polarization, for example for generating 1D, 2D or 3D spatial light geometries with tunable polarization.

SUMMARY OF THE INVENTION

The invention is defined by the claims.

According to examples in accordance with an aspect of the invention, there is provided a luminaire comprising:

an array of lighting units, arranged as a plurality of regions; and a reflector arrangement over the array of lighting units for directing the light from each region of the array of lighting units to a different spread of light output directions, wherein the reflector arrangement comprises a plurality of mutually differently oriented reflectors, each reflector of said plurality of reflectors comprises a respective associated flat reflector surface, wherein each lighting unit of at least one of the regions comprises a first sub-unit with an output of polarized first light and a second sub-unit with an output of second light being different from the first light in polarization, said polarized first light either having a polarization direction parallel to said respective flat reflector surface or having a polarization direction orthogonal to said parallel polarization direction, and wherein the first and second sub-units are independently controllable.

In this way, the light output in a certain range of directions can be controlled to have a desired polarization, or indeed no polarization (if the second light is unpolarized light). In this way, a desired lighting effect can be set, with different polarizations in different directions. The polarization can be set to a static pattern (i.e. different polarization in different light output directions) or it can be dynamically controlled.

The first light may be polarized and the second light may be non-polarized. Thus, a pattern of polarized light output regions and non-polarized light output regions may be formed.

The feature of direction of polarized light, i.e. "said polarized first light either has a polarization direction parallel to said respective flat reflector surface or has a polarization direction orthogonal to said parallel polarization direction", can alternatively be worded as, "said polarized first light either has no component of its polarization direction which is orthogonal to the plane of said flat reflector surface, thus extending parallel to said flat reflective surface, or that said polarized light has a polarization direction orthogonal to said parallel polarization direction and comprises a significant component orthogonal to the plane of said flat reflective surface". The feature that the plurality of reflectors of which each reflector comprises a flat reflector surface in combination with the orientation of the polarization direction of the respective lighting units of each respective region, results in an improved preservation of the polarization direction after reflection at said respective flat reflector surface of the initially direction of polarization of light as issued from the respective lighting units in comparison to the case of use of curved reflector surfaces. Preferably, said feature of flat reflector surfaces applies to all regions of the array of lighting units where reflectors are used.

Alternatively, the first light may be polarized with a first polarization direction and the second light is polarized with a second, orthogonal, polarization direction. Non-polarized output may be generated by combining both polarizations so that the pattern may then comprise regions of one polarization, an orthogonal polarization or a mixed i.e. non-polarized output. The three different types of output thus can be generated in a compact way.

Each lighting unit of at least one of the regions may comprise a first sub-unit with a non-polarized output, a second sub-unit with a polarized output having a first polarization direction and a third sub-unit with a second, orthogonal polarization direction, wherein the first to third sub-units are independently controllable.

This enables the generation of non-polarized light output regions more efficiently but in a less compact way, and again enables the polarization to be controlled between two different polarizations or no polarization.

The first polarization direction is for example horizontal and the second polarization direction is for example vertical, in particular the horizontal and vertical direction are relative with respect to the (vertical) direction of the gravitational force. The polarization control may for example be used to control reflections and glare, as occur, for example, at wet road surfaces.

In one example, each sub-unit comprises an LED or LED array, a total internal reflector collimator and, for the sub-units generating a polarized output (e.g. the second and third sub-units for the three-sub-unit example), a polarizer over the collimator. This provides collimation before polarization, so that the collimator does not need to be polarization-maintaining.

In another example, each sub-unit comprises an LED or LED array and for the sub-units generating a polarized output (e.g. the second and third sub-units for the three-sub-unit example), a polarizer over the LED or LED array, and the lighting unit further comprises a shared total internal reflector collimator over the first to third sub-units. In this case, a polarization-maintaining collimator may be used which can be shared between the different sub-units.

In all cases, the polarizing arrangement for example comprises a patterned dual brightness enhancement film.

The regions may be arranged as a plurality of concentric regions.

The reflector arrangement may comprise a plurality of annular reflectors each between adjacent concentric regions. In this way, there is a general optical axis and the regions form rings around that axis. The range of output directions is then a range of angles to and around that general optical axis and enables control of illumination of specific areas with a desired type of polarized or non-polarized light in a relatively simple manner. This is only one possible arrangement.

One or more concentric regions may comprise a lens. A lens may be a more effective way to create certain ranges of light output angles. Thus, the luminaire may combine lenses and reflectors to create the different directional outputs from the different regions of the array of lighting units. There may for example be no reflector between the central concentric region and the adjacent concentric region.

There may for example be 3 to 6 concentric regions.

In one set of examples the luminaire comprises an outdoor luminaire housing sealed against ingress of water and/or dust, and the luminaire further comprises a controller for controlling the lighting units thereby to alter the polarization characteristics of the light output. For example the housing has a degree of ingress protection indicated by IP-codes IP55, IP56, IP65 or IP66 according to IEC standard 60529. The controller for example comprises an input for receiving weather information, wherein the controlling is in dependence on the weather information. The controller may comprise an input for location information for a subject, wherein the controlling is in dependence on the location information.

The invention also provides a method for controlling a luminaire, which luminaire comprises:

an array of lighting units, arranged as a plurality of regions; and a reflector arrangement over the array of lighting units for directing the light from each region of lighting unit to a different spread of light output directions, wherein the reflector arrangement comprises a plurality of reflectors, each reflector of said plurality of reflectors comprises a respective flat reflector surface, wherein each lighting unit of at least one of the regions comprises a first sub-unit with an output of polarized first light and a second sub-unit with an output of second light being different from the first light in polarization, wherein the method comprises the steps of:

setting the polarization direction of the first light such that said polarized first light either has a polarization direction parallel to said respective flat reflector surface or has a polarization direction orthogonal to said parallel polarization direction, and independently controlling the first and second sub-units thereby to create a desired polarization output pattern to the different spreads of light output directions.

BRIEF DESCRIPTION OF THE DRAWINGS

Examples of the invention will now be described in detail with reference to the accompanying drawings, in which.

DETAILED DESCRIPTION OF THE EMBODIMENTS

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a luminaire comprising an array of lighting units, arranged as a plurality of regions. A reflector arrangement is provided over the array of lighting units for directing the light from each region of lighting unit to a different spread of light output directions. Each lighting unit of at least one of the regions comprises a first sub-unit with a first polarized light output and a second sub-unit with a second light output, the second light output being different from the first light output in polarization, wherein the first and second sub-units are independently controllable. In this way light output in a certain range of directions can be controlled to have a desired polarization. By actuating different sub-units, the polarization can be dynamically controlled. Thus, a system can be set up with a desired static polarization output pattern or the polarization pattern may be controlled to evolve over time, for example in response to external user, sensor or data input.

Figure 1:
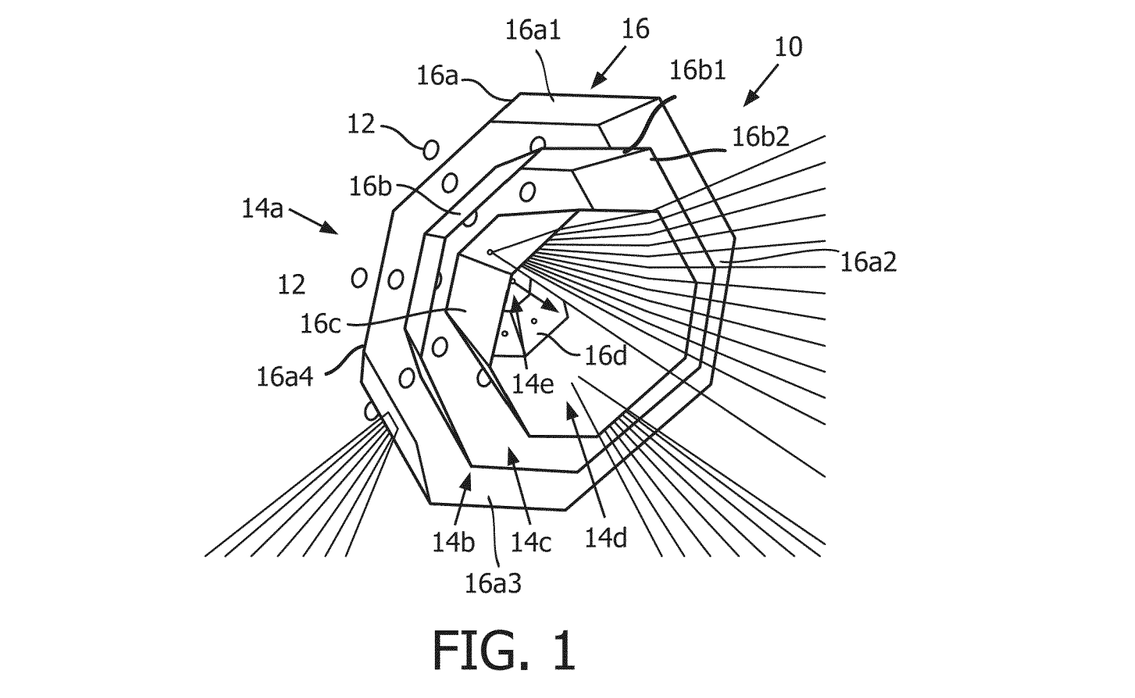
FIG. 1 shows a luminaire comprising an array of lighting units.

FIG. 1 shows a luminaire 10 comprising an array of lighting units 12, arranged as a plurality of regions 14 to 14e. A reflector arrangement 16, comprising a plurality of reflectors, e.g. 16a1, 16a2, 16a3, 16a4, 16b1, 16b2, is provided over the array of lighting units 12 for directing the light from each region of the lighting unit array to a different spread of light output directions.

In the example shown, the regions 14a to 14e are concentric octagonal regions. Thus, the lighting units form a 2D array. However, the lighting units may instead be in a line (a 1D array) or they may be provided over a 3D surface thus forming a 3D array.

A concentric arrangement may of course be based on any shape. The reflector arrangement 16 in the example shown comprises a plurality of annular reflectors 16a to 16c each between adjacent concentric regions 14a to 14e. As explained below, there may not need to be a reflector between each concentric region.

Figure 2:
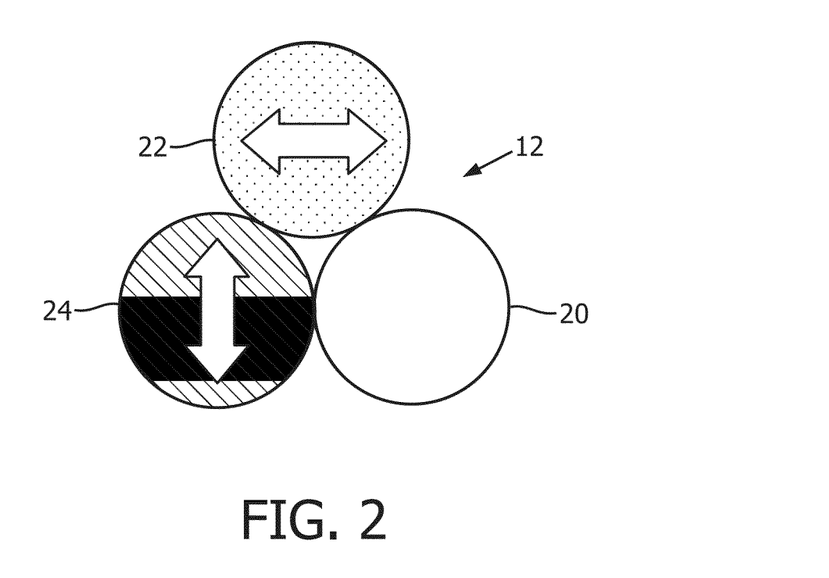
FIG. 2 shows one example of a lighting unit which has a controllable polarization.

FIG. 2 shows one example of a lighting unit 12 which has a controllable polarization. This unit with controllable polarization is used in at least one of the regions 14a to 14e. It may be used in all of the regions so that the lighting unit array is formed of identical units. However, some regions may not require controllable polarization and may for example provide only a non-polarized output.

Preferably, there are at least two regions with different output directions where the polarization in each lighting unit is controllable. More preferably there are at least three such regions, and more preferably at least four such regions.

Within a region, all lighting units may be controlled in the same way, but they may be controlled individually within the regions so that the light output polarization pattern has control at a finer resolution than the resolution of the regions as defined by the reflector arrangement. Preferably, each lighting unit is individually controllable with respect to intensity and polarization, and optionally also color. Time-dependent effects may also be implemented.

The lighting unit shown in FIG. 2 comprises a first sub-unit 20 with a non-polarized output, a second sub-unit 22 with a horizontally polarized output and a third sub-unit 24 with a vertically polarized output. The different sub-units are independently controllable. The lighting unit may be considered to be a super-pixel, and each sub-unit may comprise one LED or multiple LEDs. There may be only one sub-unit with polarized output instead of two.

The preferred example has three sub-units as shown. However, there may be only two sub-units. One possible example is a first sub-unit with a non-polarized output and a second sub-unit with a polarized output. The luminaire may only require a single type of polarized output for example for glare reduction. Another possible example is two orthogonal polarized sub-units. When operated together, they can generate non-polarized (mixed) light but in a less power efficient but more compact way.

Figure 3:
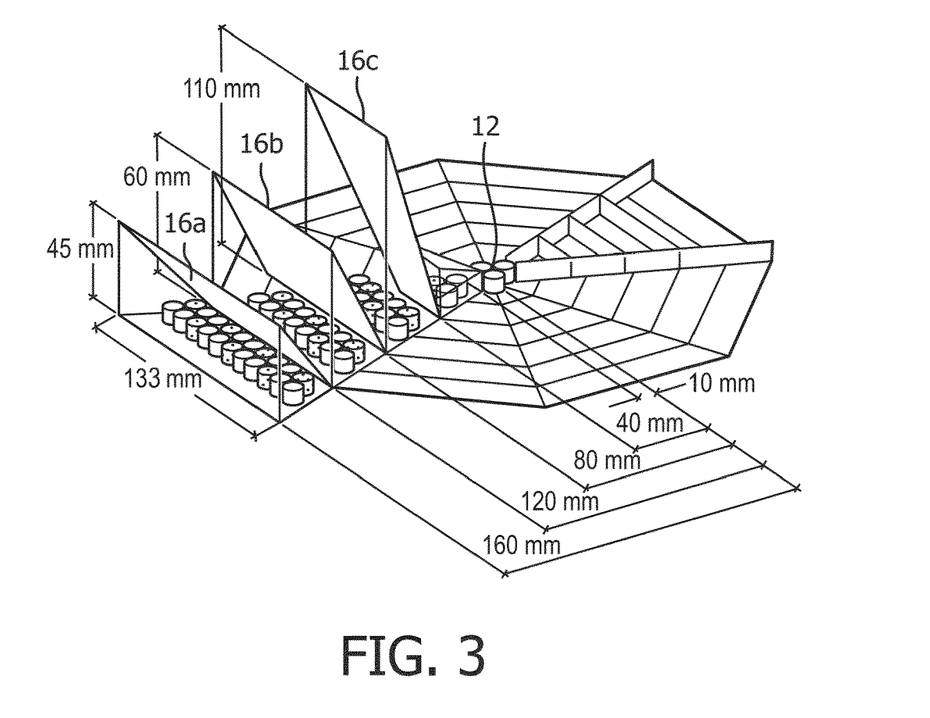
FIG. 3 shows a perspective view of the luminaire.

FIG. 3 shows a perspective view of the luminaire, showing the lighting units 12 of only one sector of the octagonal shape. It also shows some exemplary dimensions.

The diameter of the luminaire in this example is 320 mm with a height of 110 mm. Each lighting unit 12 comprises three LEDs (as shown in FIG. 2) each with a 10 mm diameter collimator. The central region contains one lighting unit. The next concentric region comprises 8 lighting units (1 in each sector), the next concentric region comprises 24 lighting unit (3 in each sector), then 40 (5×8) and 56 (7×8). Thus, this example has 5 different concentric regions. The number of lighting units per concentric region increases due to the increasing surface area that should be illuminated. In addition, the current through each LED group can be adjusted to achieve uniform illumination.

Figure 4:
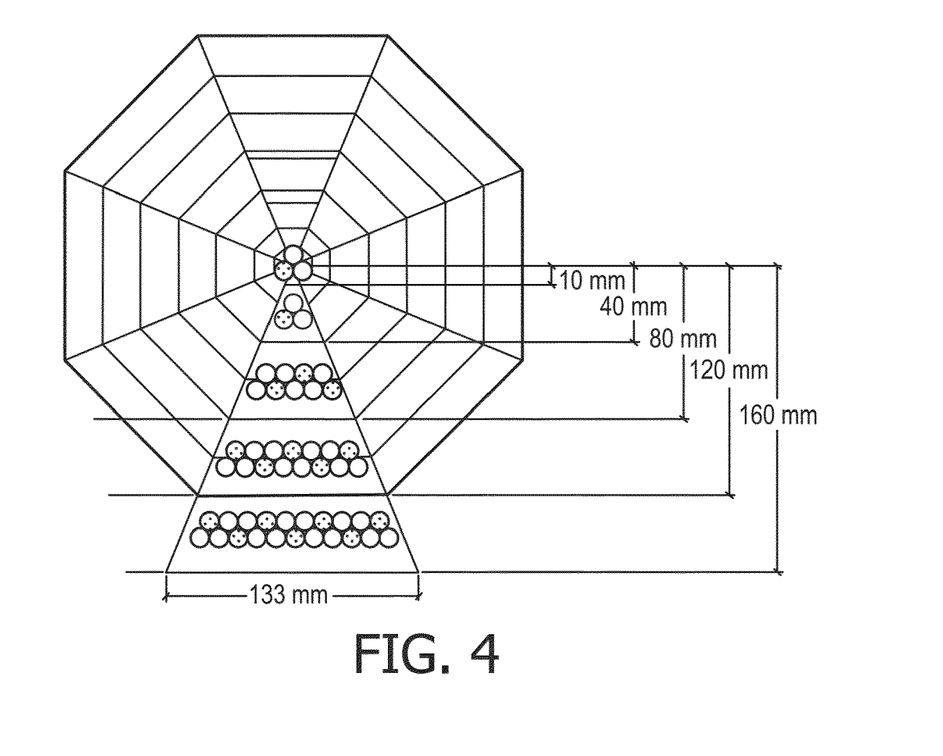
FIG. 4 shows a plan view of the luminaire of FIG. 3.

FIG. 4 shows a plan view of the arrangement of FIG. 3.

Figure 5:
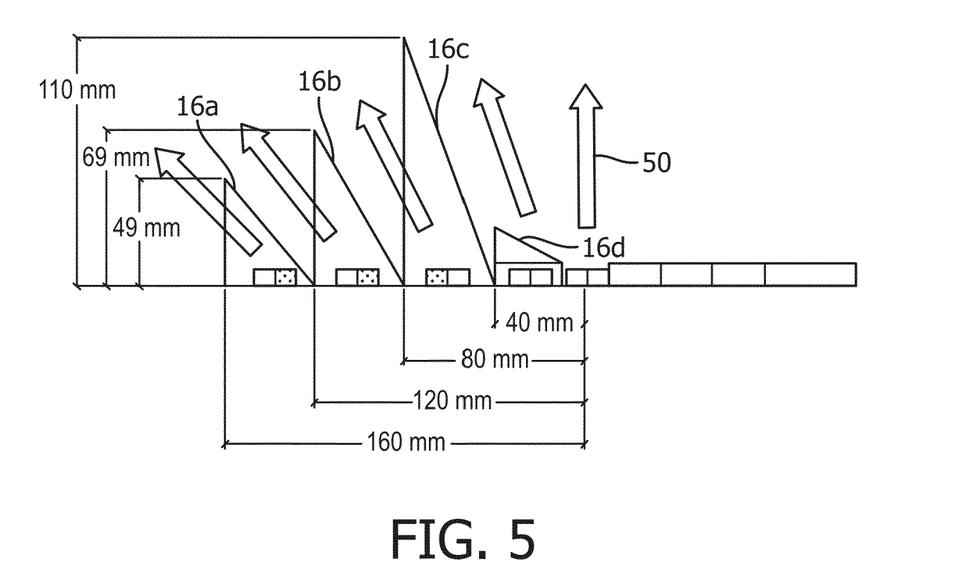
FIG. 5 shows the reflector design in more detail in cross sectional side view.

FIG. 5 shows the reflector design in more detail in cross sectional side view.

The central concentric region for example has no beam shaping or reflector arrangement associated with it outside the LED package.

Each LED for example has its own individual collimating optics that limits the output beam. The central concentric region therefor needs no further means for redirecting the beams. Thus, there is no reflector between the central (first) concentric region and the next (second) region because the LED optics provide the beam direction, The next concentric region may have a refractive redirecting arrangement 16d so that it does not need a specular reflector between it and the central concentric region. The refracting arrangement for example comprises an annular refractive prism.

By using a refractive element instead of an innermost reflector, the design is more compact. The innermost mirror would be required to deflect the light from the lighting unit over a small angle, requiring large mirrors to capture all light from the central lighting unit(s). For small deflection angles a refractive element can achieve a similar result in a more compact way.

There may instead be an additional reflector to that shown in FIG. 5 between the central and second regions. Note that the first reflector is needed by the next (third) region to control light directed radially inwardly from that region even if it is not needed by the second region because of the refractive lens. Thus, it can be seen that the reflectors provide reflection from both opposite surfaces and they each play a role for both adjacent concentric regions.

FIG. 5 shows the light output directions for each region as arrows 50. Each region has an output directed to a different spread of light output directions.

Figure 6:
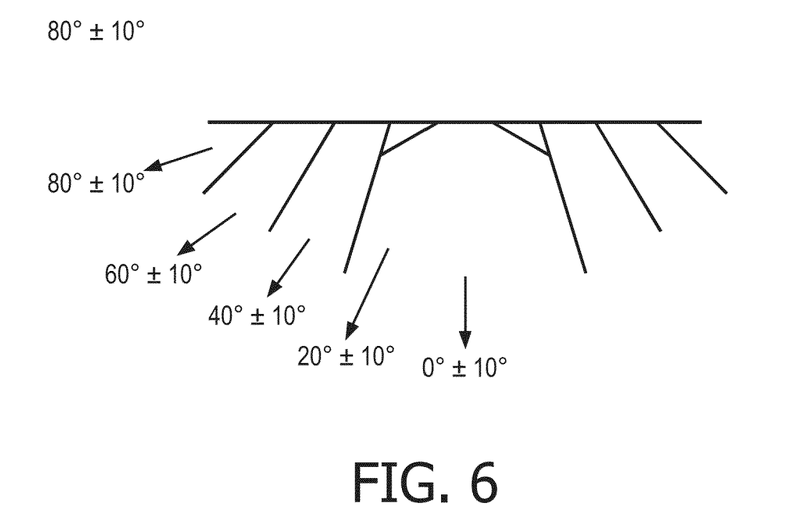
FIG. 6 shows some example of possible light output directions.

FIG. 6 shows some example of possible light output directions. The central region provides a light output centered on the normal direction, which may be considered to be the optical axis for the luminaire. The spread is for example 0±10° as shown.

The next region provides a light output centered on a direction offset to the normal by 20° with a spread 20±10° as shown.

The next region provides a light output centered on 40° with a spread 40±10° as shown.

The next region provides a light output centered on 60° with a spread 60±10° as shown.

The outermost region provides a light output centered on 80° with a spread 80±10° as shown.

The polarization in each general output direction is independently controllable. As mentioned above, there may be some regions where polarization control is not needed. For example light emitted directly downwardly from a street lamp may not produce glare so non-polarized light may be provided from the central region.

Figure 7:
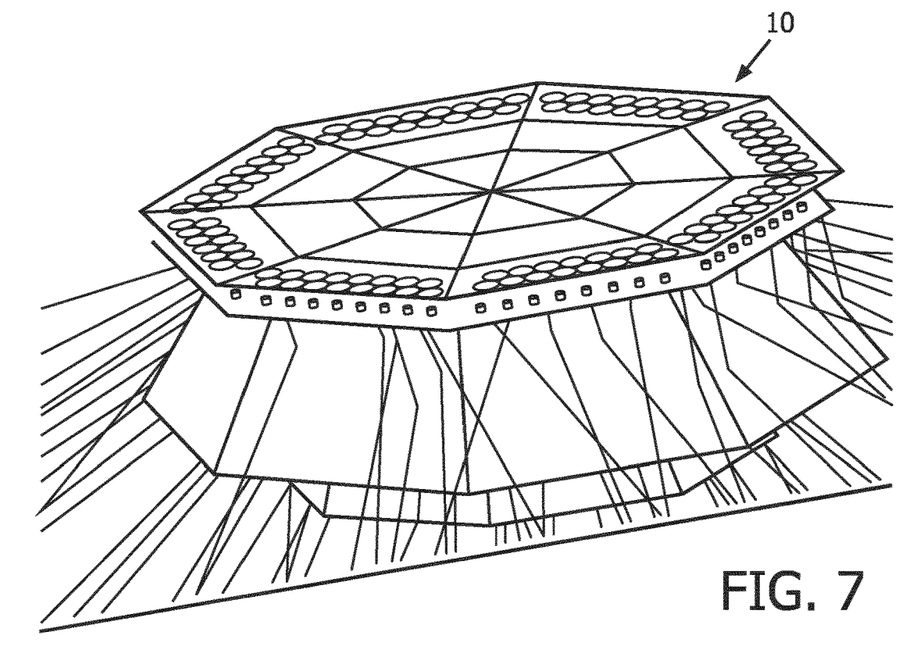
FIG. 7 shows a perspective view of the luminaire with light ray paths shown.

FIG. 7 shows a perspective view of the luminaire 10 with light ray paths shown.

Figure 8:
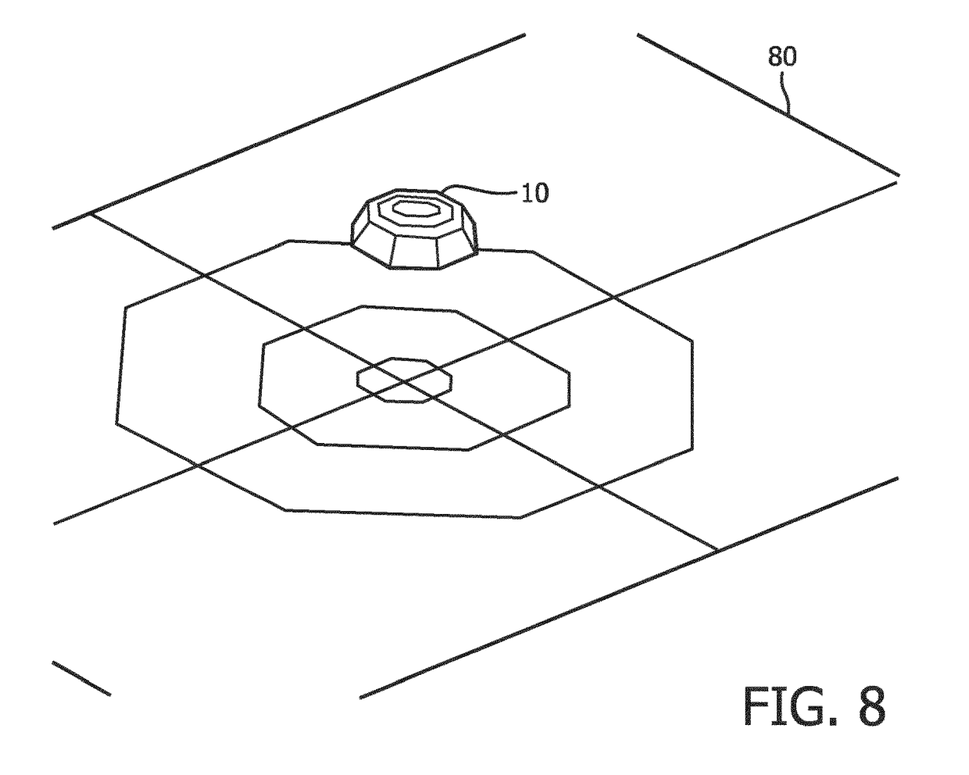
FIG. 8 shows the illumination pattern provided by the luminaire on a surface which is perpendicular to the optical axis.

FIG. 8 shows the illumination pattern provided by the luminaire 10 on a surface which is perpendicular to the optical axis.

There are various possible designs for the lighting units.

Figure 9:
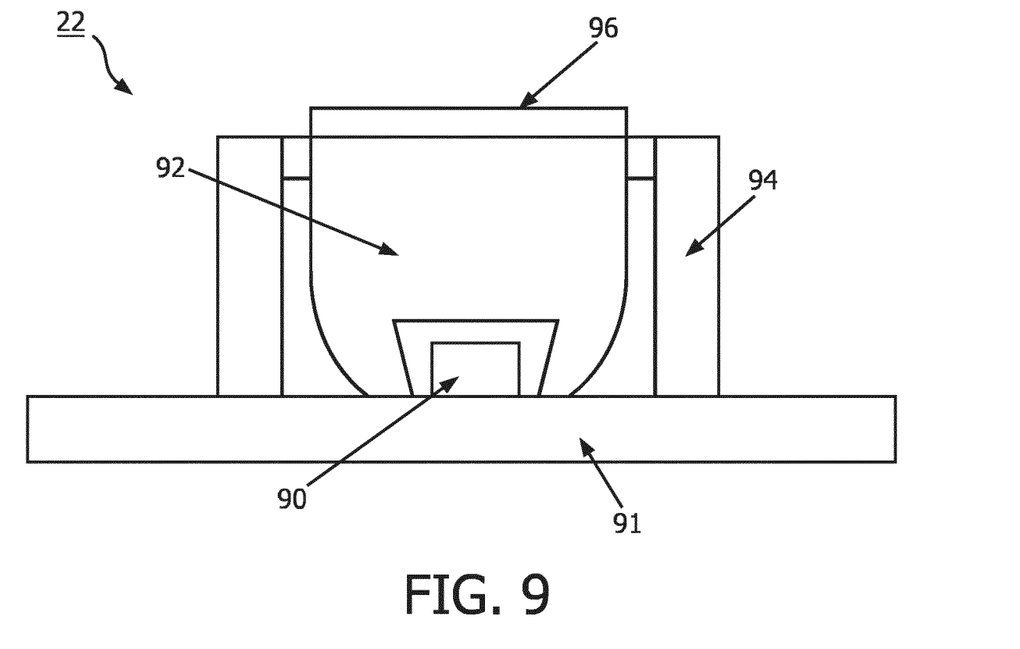
FIG. 9 shows a first example for one of the sub-units of the lighting unit.

FIG. 9 shows a first example for one of the sub-units (e.g. sub-unit 22 of FIG. 2). The sub-unit comprises a white LED 90 (for example having a phosphor-converted white light output) provided over a printed circuit board 91. The board provides mechanical support for the lighting units and the reflector arrangement and electrical connections for the lighting units. A total internal reflection collimator 92 is provided over the LED 90 and is supported by a frame 94. A polarizer sheet 96 is provided over the collimator 92. This sheet is the only element that differs between the different sub-units, and no polarizer is needed for the sub-unit which provides a non-polarized output.

The polarizer element is for example an organic material based sheet, or a metal wire grid polarizer at the exit window of each of the collimators. This puts no additional requirement on the collimator with regard to the polarization. Thus, polarizing maintain optics are not required, and no polarization direction loss needs to be considered in the primary optics. Optical-grade PMMA materials can for example be used for the collimator.

Cross-talk between the individual sub-units may be prevented by the use of a light-blocking tube envelope forming the frame 94.

Figure 10:
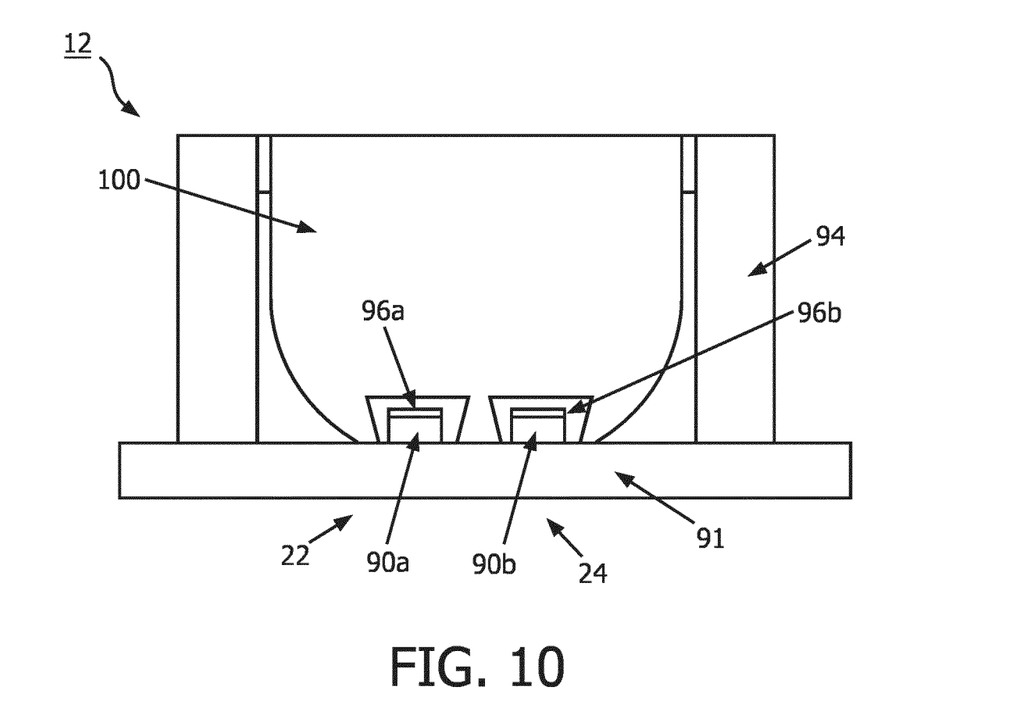
FIG. 10 shows a second example for one of the lighting units.

FIG. 10 shows a second example for one of the lighting units 12, showing two sub-units 22, 24. Each sub-unit comprises a white LED 90a, 90b and a polarizer 96a, 96b. A total internal reflection collimator 100 is provided over the set of LEDs of the lighting unit and is again supported by a frame 94. Because of the high junction temperature of the LEDs and the direct thermal contact between the LED and polarizer, the polarizer type has to be inorganic (such as a glass based metal wire grid type). Multiple polarized LEDs (of the same or different type, but with different orientation of the polarizer) are combined.

The beam shaping collimator is thus shared between all polarized LED sources. The relative position in the collimator and possibly the selected tilt angle of the optical axis of the polarized LED sources is chosen such that optimal coincidence of the tunable beam after passage through the collimator is achieved.

Preservation of the polarization and the angular distribution of the polarized light while passing through the collimator is required. Thus, the materials used should not lead to polarization loss so that glass or silicone are preferred, without internal stress in the material. The shape of all optical elements is then optimized to achieve the best polarization efficiency and polarization geometry.

Figure 11:
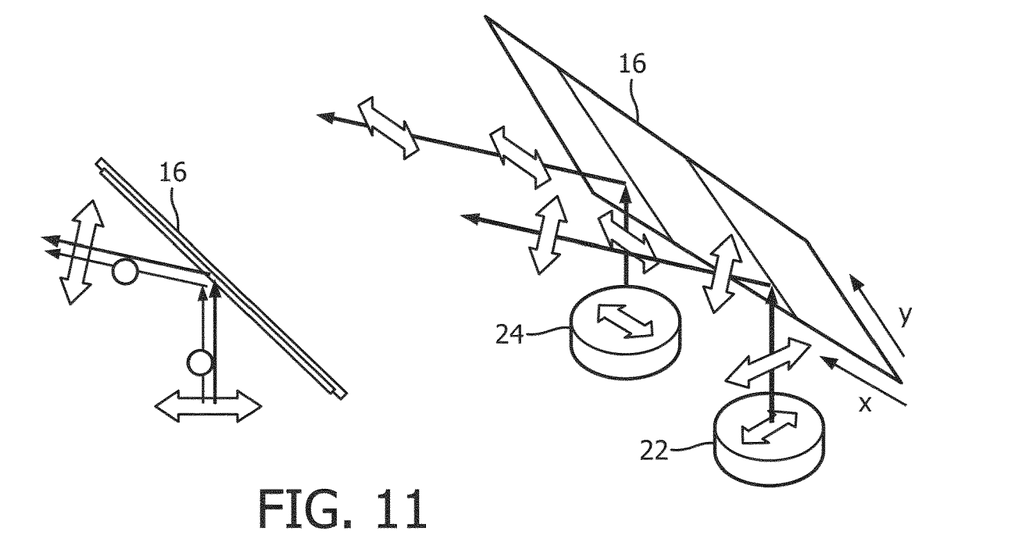
FIG. 11 shows the function of the reflector in more detail.

FIG. 11 shows the function of the reflector 16 with flat reflective surface 17, also referred to as reflection plane 17, in more detail and shows the light paths from two sub-units 22, 24 in side view (left image) and perspective view (right image). The polarization direction is either parallel or perpendicular to the reflection plane 17, i.e. the reflection plane extends in a plane x-y, the light units 22, 24 issue light such that the polarization direction of light issued by light unit 24 is parallel to said reflection plane, namely in the x-direction, while light issued by light unit 22 is orthogonal to the polarization direction of light issued by the light unit 24, meaning that it has no component in the x-direction, but for example only in the y-direction or only in y- and z-direction (in a Cartesian coordinate system). The feature that the plurality of reflectors of which each reflector comprises a flat reflector surface in combination with the orientation of the polarization direction of the respective lighting units of each respective region, results in an improved maintenance of the polarization direction after reflection at said respective flat reflector surface of the initially direction of polarization of light as issued from the respective lighting units.

The reflectors 16 of the reflector arrangement may be formed from any type of material that allows a high quality optical grade specular reflection. For example the reflector may be formed from a polymer, using e.g. injection molding forming. The reflector functionality can then be provided with a thin film deposited metal layer (e.g. Ag layer including passivation isolation). Alternatively, the reflectors can be made by combining a shaped element (e.g. polymer) with a high reflective sheet material that is glued on the shaped element. Polymer elements are preferred because of the lower weight as compared to e.g. metal (Al) elements.

The reflector can be mounted onto the carrier board 91 using glue or a mechanical clamping for example using through-holes. The reflectors for each region may be a single unit or may be a combination of smaller components.

By individually controlling the lighting units, the light intensity per angular range as well as the polarization (e.g. non-polarized, vertically polarized, horizontally polarized) may be controlled. Polarization of light is generally associated with a reduction in efficacy, caused by absorption or reflection losses in the polarizer. By only setting the lighting units associated with an angular direction to have a desired polarization, and setting the other lighting units to non-polarized light, the total efficacy of the luminaire can be much better as compared to using polarized light over the entire range.

Figure 12:
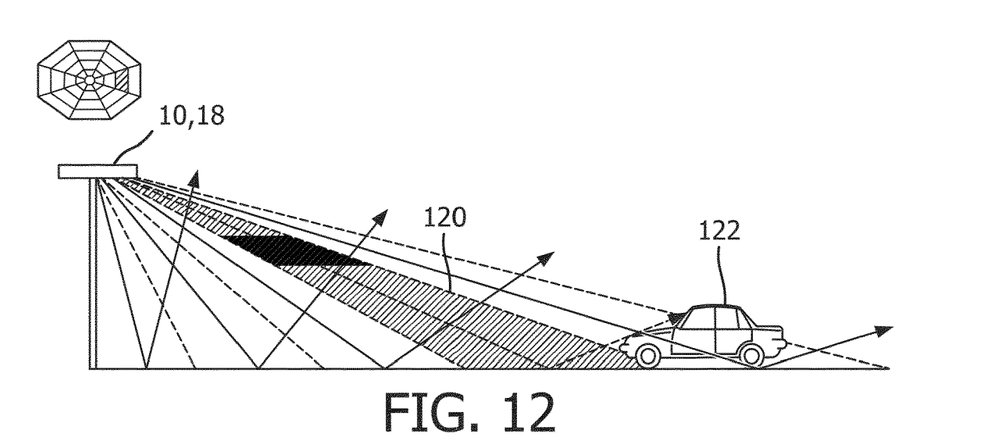
FIG. 12 shows one possible application for the luminaire for a road lighting application.

FIG. 12 shows one possible application for the luminaire 10 for a road lighting application.

When light has reflected off a wet road surface, the light is polarized by the reflection so that the reflected light has a polarization which is in the plane of the surface. The reflectivity of the light source towards the observer can be strongly reduced using polarized light. The optical characteristics of the water surface determine that this glare reduction is of particular relevance in a specific region relative to the light source (i.e. street lamp). This glare can cause discomfort to drivers and reduce safety. By vertically polarizing the light in the direction of the viewer, this glare can be greatly reduced.

Directly below a streetlamp, the angle of incidence is $\phi=0°$, whereas at infinite distance from the streetlamp in the plane of the street the angle of incidence is $\phi=90°$. At some point the parallel reflection is zero, defined by Brewster's angle. This means that glare varies as a function of position.

FIG. 12 shows an outdoor luminaire 10 with an IP66 sealed luminaire housing 18, said outdoor luminaire issues light towards five different light output regions, wherein for the region 120 where glare may be in the line of sight of a driver of a vehicle 122, a polarized output is provided, whereas more efficient generation of non-polarized light is used in other regions. Thus, only the lighting units contributing to the angular range associated with the glare to the viewer are polarized.

Sensors may be used to detect the position of cars or people to provide a system which implements dynamic control. These sensors may be integrated into the luminaire, or they may be separate from the luminaire (e.g. integrated into the road), or else data can be sent to the luminaire from other intelligent (connected) systems.

It can be seen that the luminaire arrangement of the invention allows setting the polarization direction of light in 1D, 2D or 3D patterns. The polarization direction of each lighting unit can be set electronically rather than by mechanical rotation of a polarizer element.

The luminaire may be designed as a modular system which may for example be upgradable and modular by applying different reflector designs or optics to the array of lighting units. Thus, the design may easily be tailored to different applications and functionality levels.

The lighting units may provide a white light output or colored light, and the color and intensity may be fully controllable. The luminaire may be controlled in a wired infrastructure or it may be controlled wirelessly.

Various lighting applications are possible other than the road lighting example given above. The luminaire may be used in indoor applications such as in retail/fashion and museum lighting as well as numerous outdoor lighting applications such as arena lighting.

When a ceiling light is used to illuminate a wall-mounted object such as a painting, the position of a viewer will again influence whether they experience glare. Thus, glare reduction using polarization control is also of interest for indoor applications. Another example is lighting for shop window scenes, or for correcting or optimizing the viewing onto a shop counter. In general, position information of the light source, an illuminated object and the user or observer can be used to optimize the lighting effect.

The luminaire may provide a polarization pattern which is fixed in an initial installation procedure, or the polarization pattern may be dynamically controlled in use. One example based on vehicle position sensing is described above. However, a feedback loop may be used to provide control based on other captured (or obtained) information such as position of an observer, position of an object, position of the light source (if it is movable), environmental conditions such as light levels, air quality information such as clear, foggy, misty, rainy, conditions of an illuminated object such as wet or dry and detection of an icy surface etc.

By way of example, a lighting system may include a rain sensor, or other wet weather condition sensor, allowing the system to detect or anticipate (for example based on a weather forecast input provided from an external data source) weather conditions and then provide polarized light only when needed. In this way, weather information is received (current and/or forecast), and the control is in dependence on the weather information.

The control of the luminaire has not been described in detail. The required electrical functionality, such as multi-channel drivers, data management, connectivity, etc. may all be routine. There may also be environmental protection elements, such as an optically transparent, polarization-retaining envelope such as a half glass dome.

The polarization control can be realized by many different types of polarization filter, such as a metal wire grid, dual brightness enhancement film, polarizing beam splitter, thin film optics and dichroic filter. The polarizer may be provided as an additional component or it may be integrated into the structure of the light source itself. A polarizing element can thus be applied at different levels in the luminaire, to be selected depending on the form factor of the luminaire, the performance requirements, etc.

At the LED package level, a polarizer may be provided as part of the design of a light mixing box, or at the level of the LED chip itself, or as part of an optical output component of the LED. Alternatively, at the luminaire level, the polarizer may be provided at the location where the light exits the luminaire.

The light source is preferably an LED arrangement, but more generally it may be any light source that itself generates a non-polarized light output. A reflective polarizer may be used to enable re-use of light which has not been able to pass through the polarizer. There may be specular or diffuse reflection or a combination. The system may make use of $\frac{1}{2}\lambda$ or $\frac{1}{4}\lambda$ polarization rotators. The polarization may be based on linear, circular or elliptical polarization.

The lighting system may also be used to enable hazard warnings to be provided. Polarization sensitive materials may be used within traffic signs which may be actively illuminated to create special effects, such as a dynamic flashing perception, to attract attention while maintaining the surroundings (overall scenery) at a constant illumination level because the surroundings are non-sensitive to polarized light. For example, a luminaire may control the polarization of the light output in a specific direction towards a traffic sign, when an oncoming vehicle is detected.

Another feature which can be enabled by polarized light tuning is to avoid sky light pollution resulting from light reflected from the road. An electronically adjustable polarized or non-polarized luminaire can provide specific light on demand for active traffic to illuminate signs if needed (e.g. stripes on the road) and reduce the sky light pollution when no light is needed, leading to lower disturbance of e.g. wild life, or astronomers.

Typical possible applications for the invention include indoor applications such as retail, fashion, museum lighting and outdoor luminaire applications for street lighting. There are other applications where water reflection is a key disturbance to human vision, including water traffic, swimming pool illumination, ice field illumination (such as an ice hockey pitch) and in harbors and in canals, for example for optimizing maneuvering in canal locks during the evening and night.

The system of the invention primarily provides polarization control. However, the system may provide other control such as intensity, beam direction, color point and dynamic effects. The various settings are preferably controlled by a remote control or automatically in response to viewer detection and/or position identification as explained above. There may also be different scene settings for different use cases.

Figure 13:
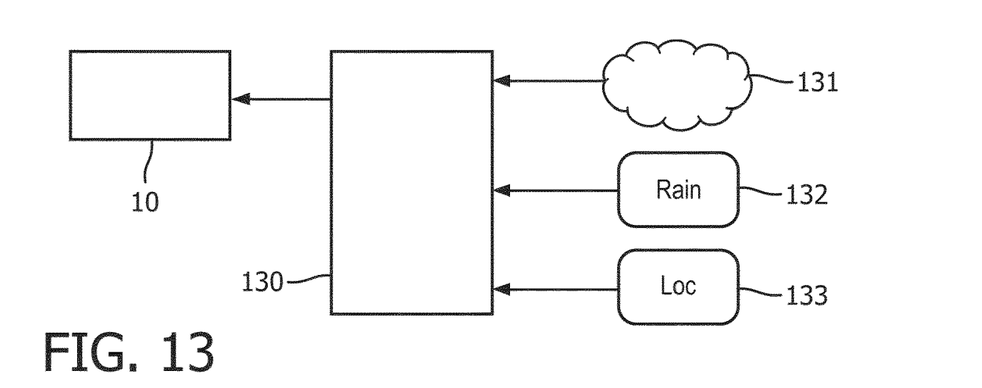
FIG. 13 shows a lighting system.

FIG. 13 shows a lighting system comprising a controller 130 for controlling the luminaire 10. The controller takes account of various inputs as described above, such as data received over the internet 131 for example weather forecasts, a rain sensor 132 or other weather sensor (barometer, thermometer, humidity sensor etc.) and a location sensor 133 for tracking the position of a subject, vehicle and/or the light source itself. These are only examples of some of the inputs that may be used to provide dynamic control.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A luminaire comprising:
an array of lighting units, arranged as a plurality of regions, each region comprising a respective plurality of sectors; and
a reflector arrangement over the array of lighting units for directing the light from the sectors of each region of the array of lighting units to a different spread of light output directions,
wherein the reflector arrangement comprises a plurality of mutually differently oriented reflectors, each reflector of said plurality of reflectors comprises a respective flat reflector surface associated with a respective sector,
wherein each lighting unit of at least one of the regions comprises a first sub-unit with an output of polarized first light and a second sub-unit with an output of second light being different from the first light in polarization, said polarized first light either having a polarization direction parallel to said respective flat reflector surface of the reflector adjacent to its associated respective sector or having a polarization direction orthogonal to said parallel polarization direction, and
wherein the first and second sub-units are independently controllable.

2. A luminaire as claimed in claim 1, wherein:
the first light is polarized and the second light is non-polarized; or
the first light is polarized with a first polarization direction and the second light is polarized with a second, orthogonal, polarization direction.

3. A luminaire as claimed in claim 1, wherein each lighting unit of at least one of the regions comprises a third sub-unit with an output of non-polarized third light, wherein the polarized first light output of the first sub-unit has a first polarization direction, wherein the second sub-unit has an output of polarized second light having a second, orthogonal polarization direction, and wherein the first to third sub-units are independently controllable.

4. A luminaire as claimed in claim 2, wherein the first polarization direction is horizontal and the second polarization direction is vertical.

5. A luminaire as claimed in claim 2, wherein each sub-unit of said at least one of the regions comprises an LED or LED array, a total internal reflector collimator and, for those sub-units providing a polarized output, a polarizing element over the collimator.

6. A luminaire as claimed in claim 2, wherein each sub-unit of said at least one of the regions comprises an LED or LED array and for those sub-units providing a polarized output, a polarizing element over the LED or LED array, and the lighting unit further comprises a shared total internal reflector collimator over the sub-units.

7. A luminaire as claimed in claim 5, wherein the polarizing arrangement comprises a patterned dual brightness enhancement film.

8. A luminaire as claimed in claim 1, wherein the regions are arranged as a plurality of concentric regions and the reflector arrangement comprises a plurality of annular reflectors each between at least some adjacent concentric regions.

9. A luminaire as claimed in claim 8, wherein one or more concentric regions comprise a lens.

10. A luminaire as claimed in claim 9, wherein there is no reflector between the central concentric region and the adjacent concentric region.

11. A luminaire as claimed in claim 7, comprising 3 to 6 concentric regions.

12. A luminaire as claimed in claim 1, comprising an outdoor luminaire housing sealed against ingress of water and/or dust, and the luminaire further comprises a controller for controlling the lighting units thereby to alter the polarization characteristics of the light output.

13. A luminaire as claimed in claim 12, wherein the controller comprises a receiver for receiving sensor, external user or data input containing weather information, wherein the controlling is in dependence on the weather information.

14. A luminaire as claimed in claim 12 wherein the controller comprises a receiver for receiving sensor, external user or data input containing location information for a subject, wherein the controlling is in dependence on the location information.

15. A method for controlling a luminaire, which luminaire comprises:
an array of lighting units, arranged as a plurality of regions each region comprising a respective plurality of sectors; and
a reflector arrangement over the array of lighting units for directing the light from the sectors of each region of lighting unit to a different spread of light output directions wherein the reflector arrangement comprises a plurality of mutually differently oriented reflectors, each reflector of said plurality of reflectors comprises a respective flat reflector surface associated with a respective sector,
wherein each lighting unit of at least one of the regions comprises a first sub-unit with an output of polarized first light and a second sub-unit with an output of second light being different from the first light in polarization,
wherein the method comprises the steps of:
setting the polarization direction of the first light such that said polarized first light either has a polarization direction parallel to said respective flat reflector surface of the reflector adjacent to its associated respective sector or has a polarization direction orthogonal to said parallel polarization direction, and
independently controlling the first and second sub-units thereby to create a desired polarization output pattern to the different spreads of light output directions.

* * * * *